United States Patent
Rhee et al.

(10) Patent No.: US 7,676,832 B2
(45) Date of Patent: **\*Mar. 9, 2010**

(54) PERSONALIZED SERVICE PROVIDING SYSTEM AND PROFILE INFORMATION CLASSIFYING AND PROCESSING METHOD THEREOF

(75) Inventors: Je-Hun Rhee, Daejeon (KR); Gyung-Chul Sihn, Daejeon (KR); Dae-Sik Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1155 days.

This patent is subject to a terminal disclaimer.

(21) Appl. No.: 11/272,549

(22) Filed: Nov. 9, 2005

(65) Prior Publication Data

US 2006/0136395 A1 Jun. 22, 2006

(30) Foreign Application Priority Data

Dec. 17, 2004 (KR) .................. 10-2004-0108245

(51) Int. Cl.
G06F 7/04 (2006.01)
(52) U.S. Cl. .................................. 726/5; 726/4; 726/6
(58) Field of Classification Search .................. None
See application file for complete search history.

(56) References Cited

U.S. PATENT DOCUMENTS 5,958,016 A * 9/1999 Chang et al. ............... 709/229

2006/0047753 A1 * 3/2006 Pal ............................. 709/206

FOREIGN PATENT DOCUMENTS

| EP | 1 331 785 A1 | 7/2003 |
|----|--------------|--------|
| JP | 2002-526978 | 8/2002 |
| KR | 1020030054104 A | 7/2003 |

OTHER PUBLICATIONS

Hamid Harroud, et al, "Policy-Driven Personalized Multimedia Services for Mobile Users", IEEE Transactions on Mobile Computing, vol. 2, No. 1 pp. 16-24, Jan.-Mar. 2003.

* cited by examiner

*Primary Examiner*—Pramila Parthasarathy
(74) *Attorney, Agent, or Firm*—Blakely, Sokoloff, Taylor & Zafman (57) ABSTRACT

The present invention relates to a personalized service providing system and a profile information classifying and processing method thereof. The system, linked to a plurality of subscriber stations to provide a personalized service to a subscriber station, classifies and processes profile information for the service. In the profile information classifying and processing method, a) subscriber profile information is generated, b) the subscriber profile information is classified into static profile information and dynamic profile information, and c) the dynamic profile information is selected from the subscriber station to manage the selected dynamic profile information and the static profile information is selected from the system to manage the selected static profile information. The the static and dynamic profile information is classified into public and private profile information to manage the classified static and dynamic profile information.

9 Claims, 7 Drawing Sheets

```
<?xml version 1.0" encoding="UTF-8"?>
<profileDatatype      xmlns:xs="http://www.w3.org/2001/XMLSchema-instance"
xsi:noNamespaceschemaLocaton=suhscriberPrmfileType.xsd>
t1——<SubscriberProfile>
  t2——<SubscriberInfo>
       <OperatorID><OperatorID>
       <SubscriberID> </SubscriberID>
       <AuthorizationKey> </AuthnrizationKey>
  </SuhscriberInfo>
  t3——<StaticProfile>
       <Public>
         <Name>Name</Name>
         <Province>Province </Province>
       </Public>
       <Private>
         <SSNumber>Social security Number</SSNumber>
         <Birthdate>Date of Birth</Birthdate>
         <mobilephone>Mobile phone number</MobilePhone>
       <Private>
  </StaticProfile>
  t4——<DynamicProfile>
       <Public>
         <AlarmFlag>ON </AlarmFlag>
         <Location>Current location</Location>
       </Public>
       <Private>
         <Feeling>Depression</Feeling>
       </Private>
  </DynamicProfile>
</SubscriberProfile>
</profileDatatype>
```

```xml
<?xml version"1.0" encoding"UTF-8"?>
<profileDatatype      xmlns:xsi"http://www.w3.org/2001/XMLSchema-instance"
xsi:noNamespaceSchemaLocation="SubscriberServiceProfileType.xsd">
st1 — <SubscriberServiceProfte>
st2 —   <SubscriberInfo>
            <OperatorID></OperatorID>
            <SubscriberID></SubscriberID>
            <AuthorizationKey></AuthorizationKey>
        </SubscriberInfo>
st3 —   <ProfileInfo>
            <Name>Name</Name>
            <Province>Province </Province>
            <SSNumber>Social security Number</SSNumber>
            <Birthdate>Date of Birth</Birthdate>
            <MobilePhone>Mobile phone number<MobilePhone>
            <AlarmFlag>ON</AlarmFlag>
            <Location>Current location</Location>
        </ProfileInfo>
    </SubscrbierServiceProfile>
</profileDatatype>
```

PERSONALIZED SERVICE PROVIDING SYSTEM AND PROFILE INFORMATION CLASSIFYING AND PROCESSING METHOD THEREOF

CROSS-REFERENCE TO RELATED APPLICATION

This application claims priority to and the benefit of Korean Patent Application No. 10-2004-0108245 filed in the Korean Intellectual Property Office on Dec. 17, 2004, the entire contents of which are incorporated herein by reference.

BACKGROUND OF THE INVENTION (a) Field of the Invention

The present invention relates to an information classifying and service providing system, and more particularly, to a method for classifying and processing profile information and a personalized service providing system using the method.

(b) Description of the Related Art

In general, a customized service has been provided for a user when services based on available resources including predetermined contents are provided for the users through a network. The available resources are not randomly selected but are selected based on subscriber profile information to provide the customized service (i.e., a personalized service). Various methods for providing the personalized service have been studied, and in the methods, the service is generally formed based on the user profile information.

A prior art relating to the personalized service may be found in Korean Patent Publication No. 2003-0054104 entitled "Contents personalization method and apparatus by aggregating multiple profiles". In this patent, a profile is provided including information about user preferences, terminal content display, content display conditions, and content developer's requirements, a standard for generating personalized contents is automatically generated by matching the profile information according to a predetermined standard, and the personalized contents are generated according to the generated standard to be provided to a user terminal.

In the prior arts, the personalized service is provided by using the profile information and available resources without considering a subscriber environment which is varied in real time.

That is, the personalized service is provided in a centralized method using the profile information of users registered in a system without considering the subscriber environment which is dynamically varied according to a place and a time. In addition, when the profile information relating to the user is provided to the system, the system uses the provided profile information and available resources according to a subscriber location, and provides a customized personal service to the subscriber.

However, the profile information underpinning the personalized service may vary depending on the subscriber environment. Accordingly, an optimum personalized service may not be provided to the subscriber when the subscriber profile information previously provided to the system is used without considering the changing subscriber profile information.

Accordingly, it is required to efficiently classify and manage the subscriber profile information so as to provide the optimum personalized service.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for efficiently classifying and processing subscriber profile information that varies according to time and location, and to provide an optimized service according to a subscriber environment by generating a subscriber-related service profile based on the subscriber information varying in real time, searching available resources based on the service profile, and using the searched resources.

In an exemplary method for classifying and processing the profile information for a personalized service in a system providing the service to a plurality of subscriber stations linked to the system through a network, a) subscriber profile information is generated, b) the subscriber profile information is classified into static profile information and dynamic profile information, and c) the dynamic profile information is selected from the subscriber station to manage the selected dynamic profile information and the static profile information is selected from the system to manage the selected static profile information, and the static and dynamic profile information is classified into public and private profile information to manage the classified static and dynamic profile information.

An exemplary system linked to a plurality of subscriber stations through a network to provide a personalized service to a plurality of subscriber stations according to an embodiment of the present invention includes an authentication unit, a profile generator, a resource manager, and a service provider. The authentication unit determines a location of the subscriber accessing the system through the network, and identifies the subscriber. The profile generator receives terminal profile information according to a subscriber's current situation from the subscriber station, and includes a storage module storing the system profile information provided for the respective subscribers. The resource manager manages and stores information on available resources to processed on a network. The service provider selects the available resource based on the applied service profile, and provides the personalized service to the subscriber station based on the selected available resources. In addition, the terminal profile information is classified into dynamic/public profile information and dynamic/private information, and the system profile information is static/public profile information and static/private profile information. In addition, the profile generator selects the system profile information from the storage module based on the identified subscriber information, combines the terminal profile information provided by the subscriber station and the system profile information, and generates the service profile.

DETAILED DESCRIPTION OF THE EMBODIMENTS

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

According to an exemplary embodiment of the present invention, through an agent technology in a distributed environment, subscriber profile information is separately managed in a subscriber station and a system, the profile information is classified into static profile information which is not varied according to time and context and dynamic profile information that is varied according to time and context, and the static and dynamic profile information is classified into private and public information, and therefore a personalized service based on optimum profile information is provided according to a subscriber's establishment.

The subscriber profile information may include the static profile information including name and social security number, and the dynamic profile information may include current address, phone number, and location (i.e., whether the subscriber is in a room alone, a meeting room, or a public place). In addition, the subscriber profile information may include private profile information relating to privacy, feeling, and so on, and the private profile information may be temporarily released to the public according to a user request. Since the private profile information including the subscriber's feeling is temporarily converted into the public profile information when the subscriber feels depression and is unwilling to receive a contact, more accurate information may be provided to a system providing the personalized service.

In further detail, the subscriber profile information is classified into the dynamic/static and the private/public information, the subscriber profile information is separately provided to agents in a subscriber station and a system, and a customized service may be provided through a profile negotiation between the two agents. That is, a service profile which is a basic source for providing the personalized service is generated. When the profile negotiation is performed, the subscriber profile information (hereinafter, referred to as terminal profile information) provided from the subscriber station to the system is filtered by using a dynamic profile filter so as to transmit information satisfying predetermined conditions.

Based on the classified profile information, profiles separately stored in the subscriber station and the system, rather than subscriber profiles concentrated on the system, are processed by an interworking operation between the agents in the system and the subscriber station, and a subscriber related profile for providing a new service in real time (hereinafter, referred to as a service profile) is generated. Based on the service profile, available resources are found in a subscriber environment, an appropriate available resource for the service profile is searched from the found available resources, and a predetermined service is provided based on the appropriate available resources for the service profile.

As described, according to the exemplary embodiment of the present invention, the user profile information for the personalized service is efficiently classified and separately provided to the agents in the subscriber station and the system, and the service profile according to the subscriber environment is generated in real time through the negotiation between the agents, and therefore the personalized service optimized according to the subscriber environment may be provided. The available resource includes data and contents for configuring a service provided through a network, and the service provided to the subscriber includes various services to be provided through the network.

A configuration and an operation of a system realizing the method for classifying and processing the profile information for the personalized service according to the exemplary embodiment of the present invention will now be described.

Figure 1:
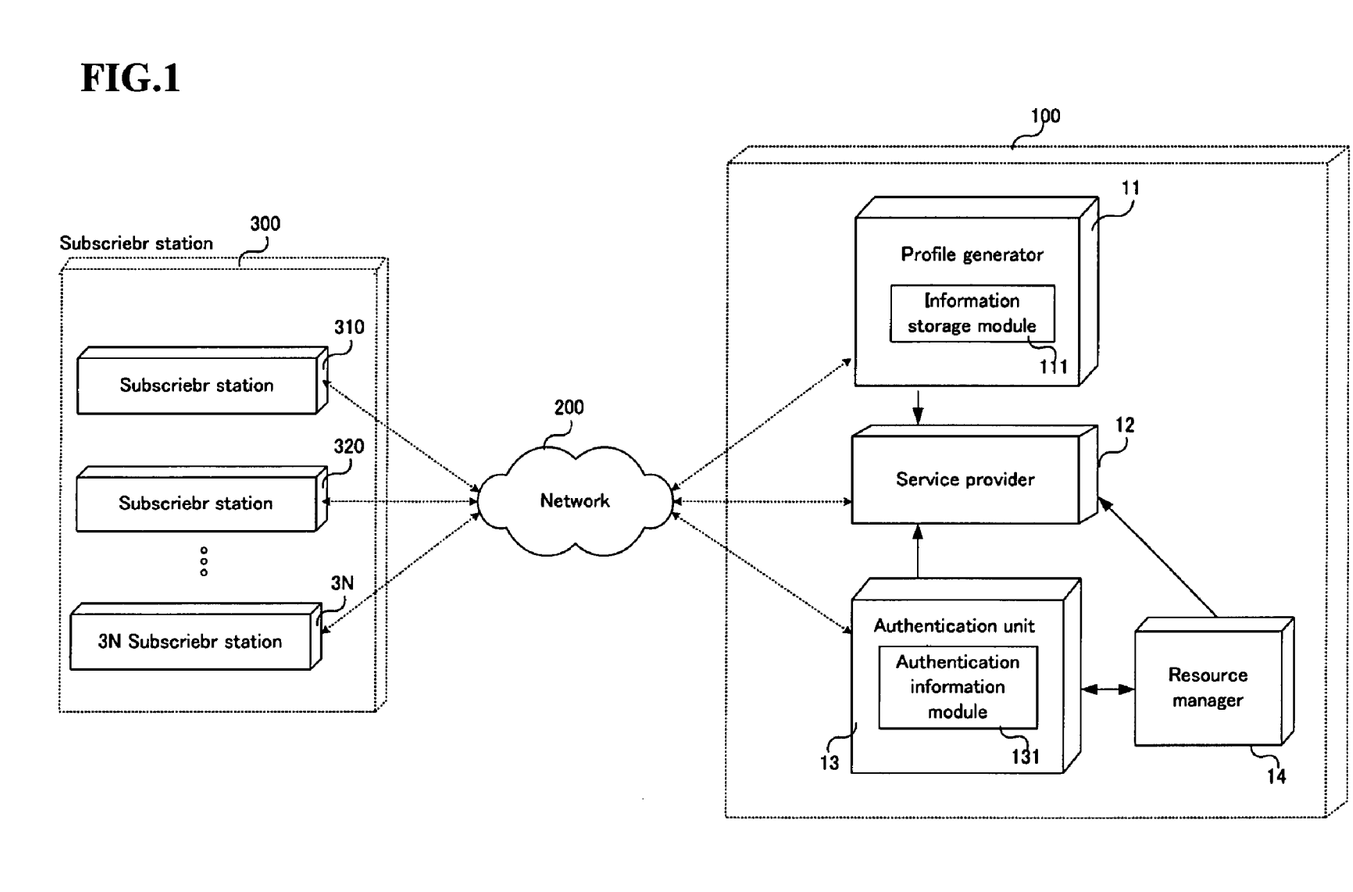
FIG. 1 shows a diagram for representing a configuration of a system realizing a method for classifying and processing profile information for a personalized service according to an exemplary embodiment of the present invention.
Figure 2:
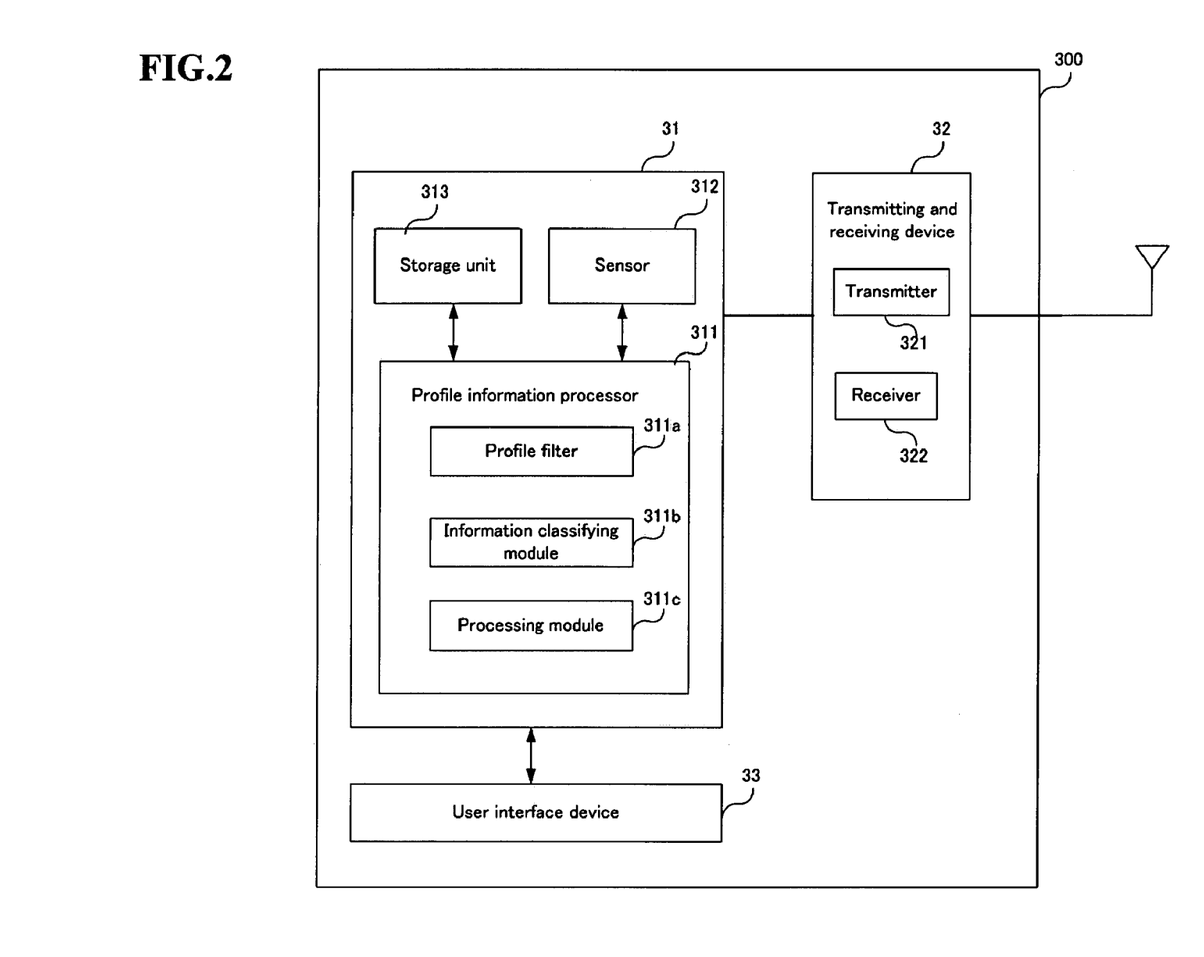
FIG. 2 shows a diagram of a configuration of a subscriber station according to the exemplary embodiment.

FIG. 1 shows a diagram for representing the configuration of the system realizing the method for classifying and processing the profile information for the personalized service according to the exemplary embodiment of the present invention. FIG. 2 shows a configuration of a subscriber station according to the exemplary embodiment.

The system realizing the method for classifying and processing the profile information for the personalized service according to the exemplary embodiment of the present invention (hereinafter, referred to as an information classifying and service providing system) is linked to a subscriber station 300 through a network 200. For convenience of description, subscriber stations 310, 320, and 3N (N=30, 40, 50, . . . ) will be referred to as the subscriber station 300.

The information classifying and service providing system 100 includes a profile generator 11 functioning as a system agent for negotiating with a terminal agent installed in the subscriber station 300 and generating a service profile, a service provider 12 functioning as a service agent for providing a personalized service based on the service profile, an authentication unit 13 sensing the subscriber station and registering a subscriber to the service provider 12 through an authentication process, and a resource manager 14 functioning as a resource management agent for managing information on available resources around the sensed subscriber.

The profile generator 11 further includes an information storage module 111 storing profile information previously provided for each subscriber, and generates a service profile based on the stored profile information and profile information provided by interworking with the subscriber station 300. The profile information stored in the information storage module 111 may be referred to as "system profile information", which is static profile information.

Accordingly, static/public profile information and static/private profile information as the system profile information are respectively stored in the information storage module 111 of the profile generator 11. However, the static profile information may be temporarily or permanently varied in a profile varying process through an authentication process for the subscriber station 300, and the variation may be performed according to a request and a control of the terminal agent of the subscriber station 300.

Based on the service profile, the service provider 12 selects an optimized resource for the subscriber from the resources provided by the resource manager 14, and provides the optimized resource (i.e., a service) to the subscriber station.

The authentication unit 13 includes an authentication information module 131 storing information for performing authentication for each subscriber, and performs the authentication operation based on information provided by the sensed subscriber station and information stored in the authentication information unit. The authentication unit 13 provides identification information for the authenticated subscriber station 300 (e.g., an identification (ID) for each subscriber) to the service provider 12, and registers the subscriber station 300 on the service provider 12.

The resource manager 14 manages information on the available resources around the sensed subscriber station, and provides the information to the service provider 12. Various methods may be used to manage the available resource information. For example, a service location protocol (SLP) which is an existing standardized protocol may be used, and a list of the available resources may be previously stored in an extensible markup language (XML) format. In the exemplary embodiment of the present invention, the resource manager 14 has a function for establishing a resource type, and available resource information is stored in the XML script format in a method or a standard selected by the resource type establishment. The stored available resource information is transmitted to the service provider 12, and is used as data for providing the personalized service to the subscriber with the service profile.

In addition, the service profile generated by the profile generator 11 is formed in the XML format. Basically, the profile information is previously stored in the information storage module 111 of the profile generator 11 (the profile information provided when the subscriber subscribes to the information classifying and service providing system), a new value and additional profile information about the existing profile information are managed by the terminal agent installed in the subscriber station 300, and the information is used to generate the service profile.

As shown in FIG. 2, the subscriber station 300 linked to the information classifying and service providing system 100 through the network 200 includes a terminal controller 31, a signal transmitting and receiving device 32, and a user interface device 33.

The terminal controller 31 includes a profile information processor 311 functioning as a terminal agent for generating subscriber profile information and providing the information to the system 100, a plurality of sensors 312 sensing various types of information on the subscriber station or various types of information on the subscriber, and a storage unit 313 storing the information about the subscriber.

The profile information processor 311 generates the terminal profile information which is the subscriber profile information based on predetermined information provided through the user interface device 33 and/or predetermined subscriber information provided by the sensors 312, and cooperates and negotiates with the profile generator 11 of the system 100 based on the terminal profile information so as to generate a service profile. More specifically, the profile information processor 311 classifies and manages the terminal profile information by using a predetermined key, and stores the terminal profile information in the storage unit 313 as necessary so as to manage the information. Accordingly, as shown in FIG. 2, the profile information processor 311 includes a profile filter 311a for filtering the terminal profile information according to a predetermined condition, an information classifying module 311b for classifying and processing the filtered terminal profile information, and a processing module 311c for negotiating with the profile generator which is an agent of the system based on the classified terminal profile information so as to generate the service profile. The profile filter 311a which is a group of filters varies values of the plurality of profile information, the values satisfying a predetermined condition.

In addition, the profile information processor 311 provides the subscriber information stored in the storage unit 313 to the authentication unit 13 of the system 100 so as to perform authentication and registration of the subscriber station.

The storage unit 313 stores the subscriber information, and the subscriber information includes a subscriber ID used for registering the subscriber on the system 100, subscription information including a password, an identification number provided to the subscriber station, and terminal capacities.

In addition, the profile information measured by the sensor 312 is classified by the profile information processor 311 to be stored. The terminal profile information classified and stored in the subscriber station 300 is the dynamic profile information varying according to environments including subscriber's feeling/context, time, and location, and the dynamic terminal profile information may be classified into dynamic/public profile information and dynamic/private profile information.

The sensor 312 includes a plurality of sensors including a location determining sensor for communicating with an external device to measure a location of the subscriber station (e.g., a global positioning system (GPS), or a location determining device), a health determining sensor for determining a subscriber's health, an environment determining sensor for determining environmental factors including temperature and humidity around the subscriber station, a speed measuring sensor for measuring an accelerated velocity according to the movement of the subscriber station, and a biometric sensor for measuring biometric information about fingerprints and the iris.

As described, the information measured by the respective sensors may be classified, processed, and filtered by the profile information processor 311 to be provided to the system 100, and therefore the system may provide the personalized service to the respective subscribers based on the subscriber's mood, location, time, and requirements in a predetermined environment.

The terminal controller 31 according to the exemplary embodiment of the present invention including the profile information processor 311, the storage unit 313, and the sensors 312 may further includes a plurality of modules for transmitting/receiving data to/from the system 100 through the network 200, and processing the data. The modules are well known to those skilled in the art, and therefore a detailed description thereof will be omitted.

The signal transmitting and receiving device 32 includes a transmitter 321 for transmitting a signal, and a receiver 322 for receiving the signal. The transmitter 321 processes a modulated and encoded signal and transmits the signal over the air.

The signal transmitting and receiving device 32 and user interface device 33 are well known to those skilled in the art, and therefore a detailed description thereof will be omitted.

Figure 3:
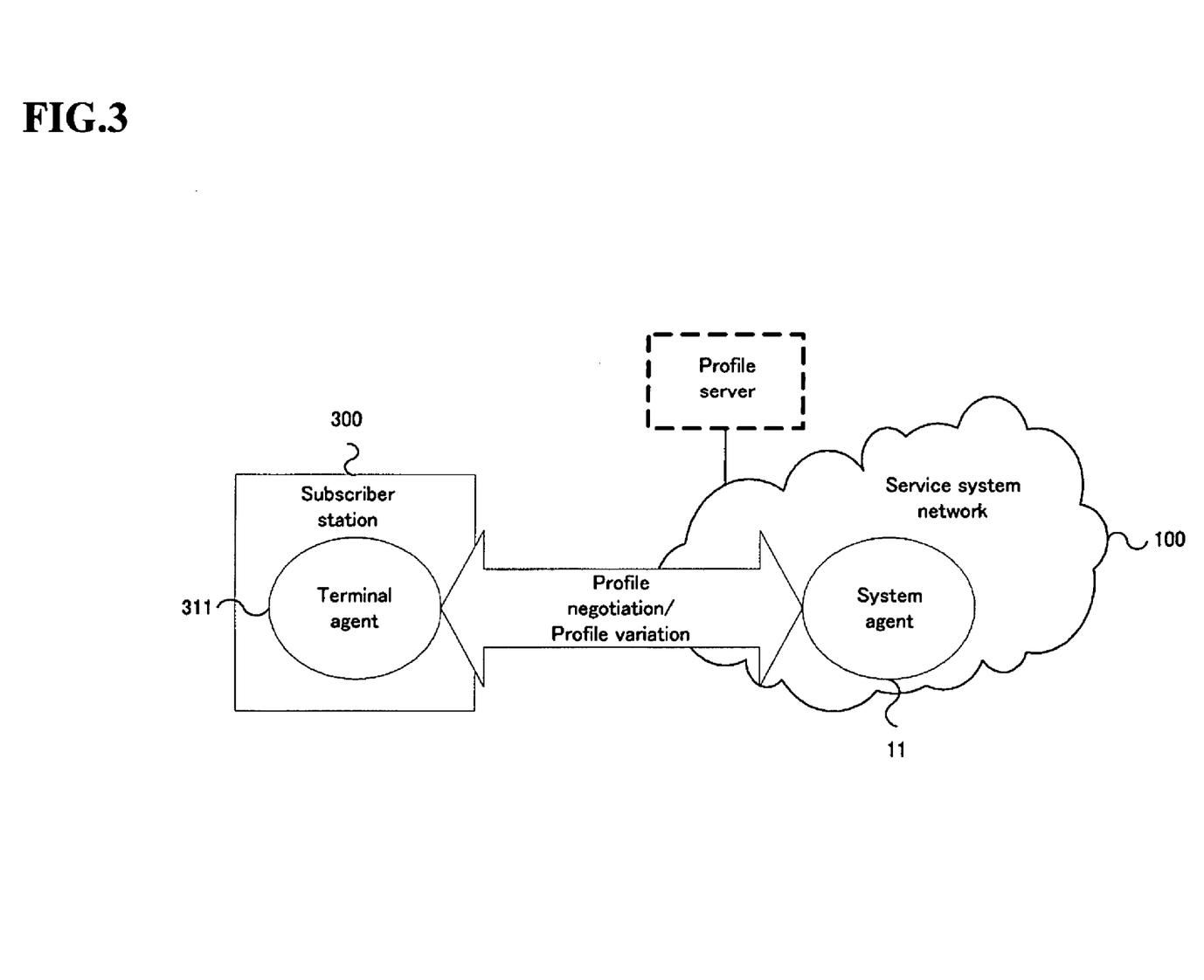
FIG. 3 schematically shows a diagram for representing an interworking relationship between the system and the subscriber station according to the exemplary embodiment of the present invention.

An interworking environment between the terminal agent (the profile information processor) installed in the subscriber station 300 and the system agent (the profile generator) installed in the system 100 is shown in FIG. 3. FIG. 3 schematically shows the agent-based interworking environment for the personalized service. As shown in FIG. 3, profile negotiation and profile variation processes may be performed by the interworking operation between the terminal agent of the subscriber station 300 and the system agent of the system 100.

A method for providing the personalized service according to the exemplary embodiment of the present invention will now be described based on the above configuration.

Firstly, a method for classifying and processing the profile information according to the exemplary embodiment of the present invention will be described.

In the exemplary embodiment of the present invention, the profile information is formed in the XML language format to facilitate extension and application, and corresponding profile information is arranged with reference to tag names. However, the profile information is not limited to the XML language format but covers various language formats.

Figure 4:
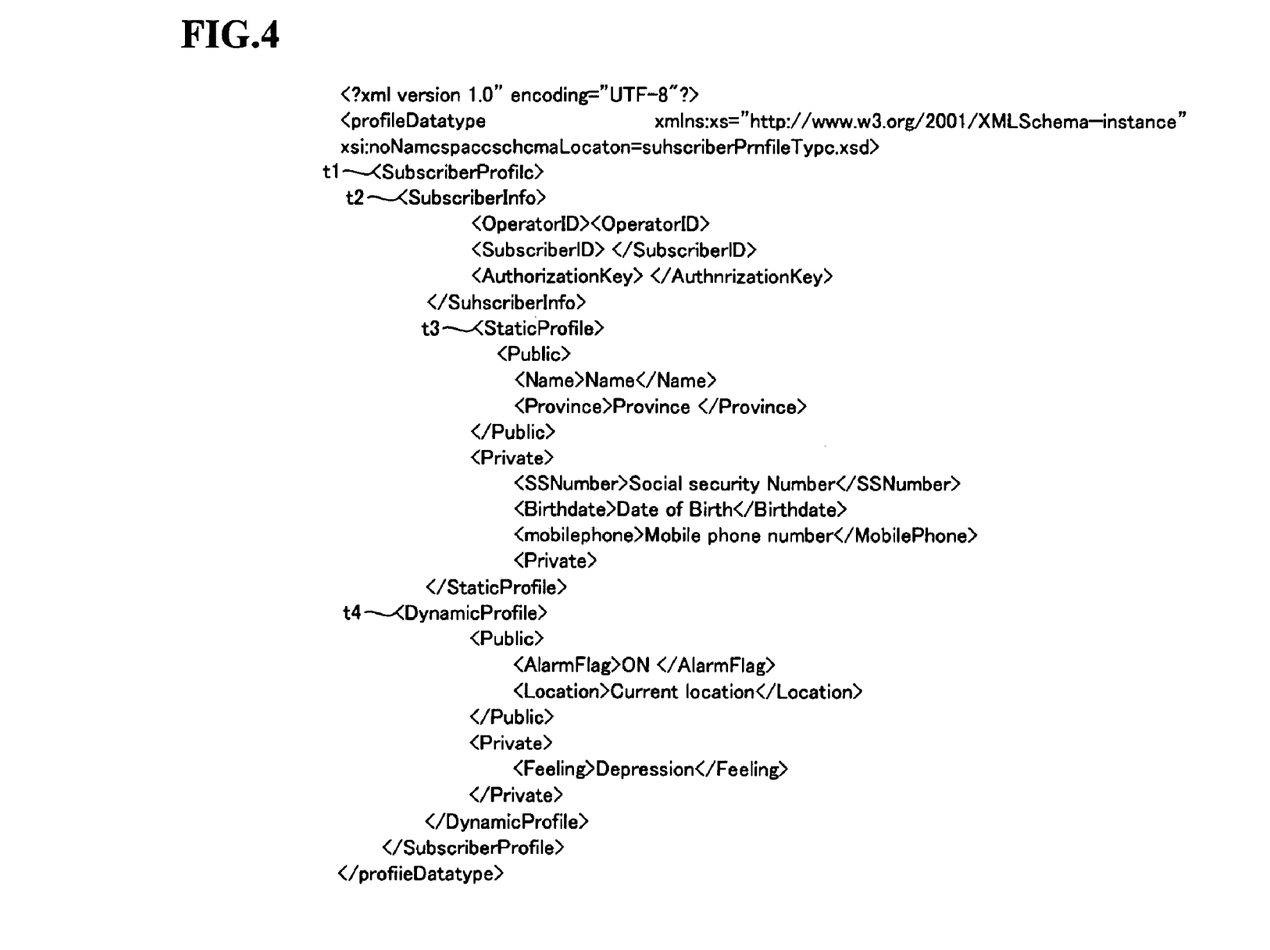
FIG. 4 shows a diagram for representing a profile classification standard and a profile classification method according to the exemplary embodiment of the present invention.

FIG. 4 shows a diagram for representing a profile classification standard and a profile classification method according to the exemplary embodiment of the present invention.

A subscriber profile tag SubscriberProfile is provided to the subscriber profile information, and the subscriber profile information is managed. As shown in FIG. 4, a subscriber information tag SubscriberInfo t2, a static profile tag StaticProfile t3, and a dynamic profile tag DynamicProfile t4 as sub-tags are provided under the subscriber profile tag t1.

The subscriber information tag t2 may include operator information for providing a service, subscriber information, and key values (ID and password) for authenticating the subscriber.

A public tag Public and a private tag Private are respectively provided under the static profile tag t3 and the dynamic profile tag t4, and thereunder, various subscriber profile information is stored.

In addition, the terminal profile information stored and managed by the subscriber station 300 includes the subscriber information tag t2 and the dynamic profile tag t4, and the public and private profile tags are included under the dynamic profile tag t4. The subscriber communicates with the profile information processor 311 (terminal agent) through the user interface device 33, and may dynamically modify various information in the dynamic profile tag t4.

The terminal profile information may include an alarm flag tag AlarmFlag, a location tag Location, and a feeling tag Feelingas shown in FIG. 4.

The alarm flag tag is to notify the system not to provide a service to the subscriber when it is not urgent, and the location tag is to manage a subscriber's location by the subscriber so that subscriber location information may not be used by the system according to a subscriber's request. The feeling tag classified as the private information is to represent a current subscriber feeling. When the feeling tag is converted as the private information to be transmitted to the profile generator 11 (the system agent), the profile generator 11 generates the service profile based on the feeling information to control the service provider 12 (the service agent) to provide an appropriate personalized service regarding the subscriber's feeling to the subscriber. The feeling tag is provided to a subscriber area, that is, the feeling tag is processed as the terminal profile information to provide more choices to the subscriber. Accordingly, the subscriber may receive the personalized service based on the profile information provided by the subscriber in real time rather than the personalized service provided by the system.

In addition, the system profile information stored and managed by the system 100 includes the subscriber information tag t2 and the static profile tag t3, and the public and private profile tags are provided under the static profile tag t2. This classification may be varied by the subscriber.

A value of the static profile tag t3 corresponding to the system profile information is stored in the system as an initial subscriber information type established when the subscriber initially subscribes to a service. The value may be modified by the subscriber. For example, the value of the static profile tag t3 may be modified after the subscriber is authenticated by the system 100 through the profile information processor 311 of the subscriber station 300.

A process for providing the personalized service to subscribers based on the profile information classified as above will now be described.

Figure 5:
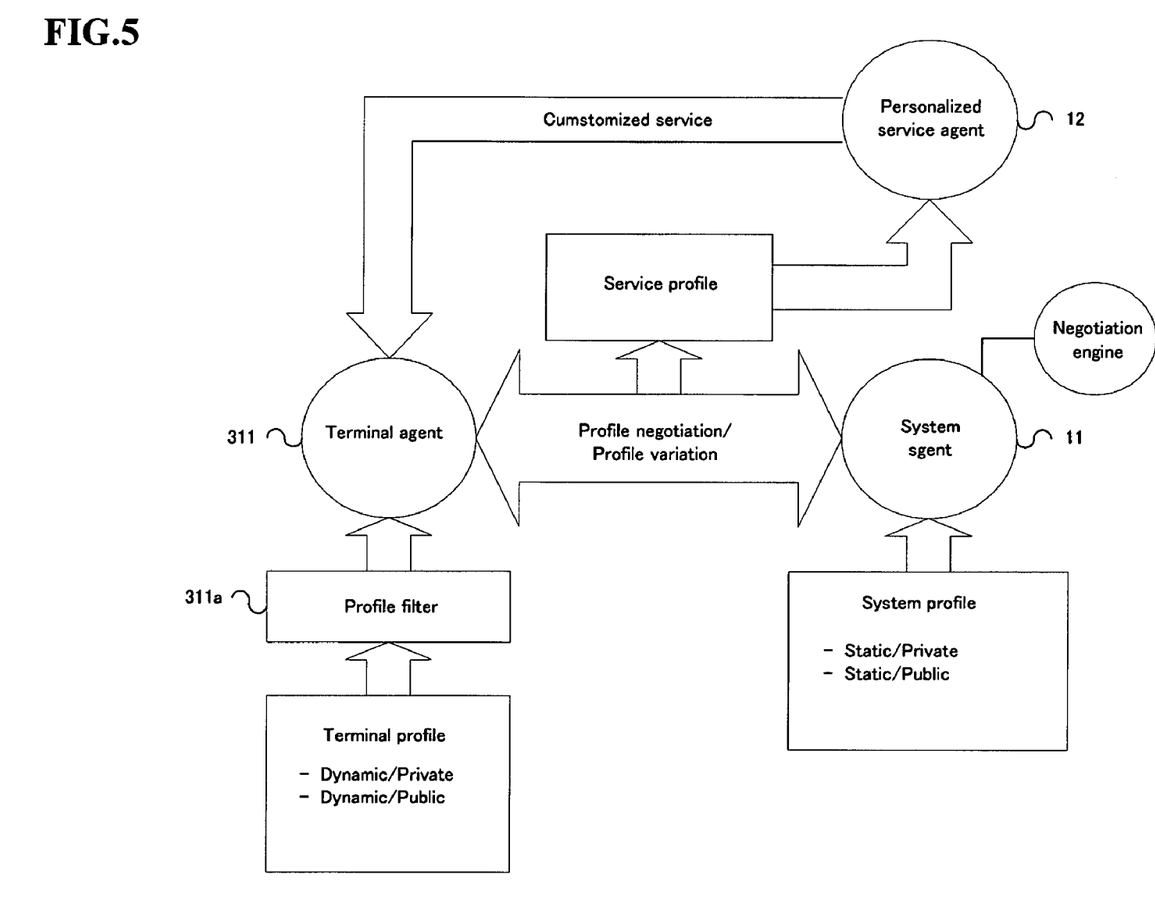
FIG. 5 shows a diagram for representing relationships while varying the profile information by the interwork between the subscriber station 300 and the system 100, and providing the personalized service based on the varied profile information.
Figure 6:
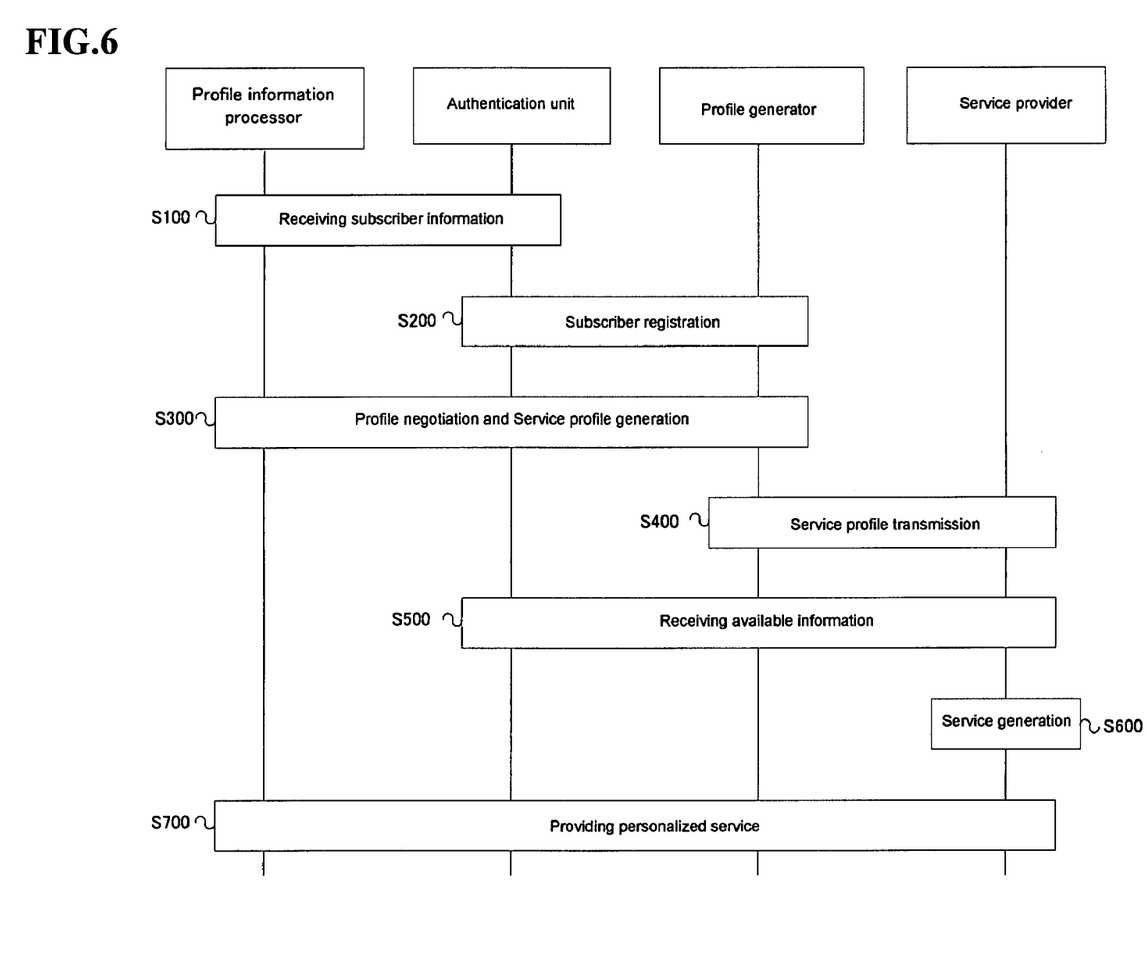
FIG. 6 shows a flowchart for representing a process for providing the personalized service.

FIG. 5 shows a diagram for representing relations for varying the profile information by the interworking operation between the subscriber station 300 and the system 100 and providing the personalized service based on the varied profile information, and FIG. 6 shows a flowchart for representing a process for providing the personalized service.

As shown in FIG. 5, the personalized service is provided by the profile information processor 311 functioning as the terminal agent of the subscriber station 300, the profile generator 11 functioning as the system agent of the system 100, the service provider 12 functioning as the service agent, and/or the authentication unit 13 functioning as a registration agent (not shown).

As shown in FIG. 6, the authentication unit 13 of the system 100 senses the sensor 312 installed in the subscriber station 300, interworks with the profile information processor 311 of the subscriber station 300, and receives the subscriber information and the subscriber station location information in step S100.

That is, the sensor 312 of the subscriber station 300 communicates with an externally installed device, generates current subscriber station location information, and transmits the current subscriber station location information to the authentication unit 13 of an access network through the signal transmitting and receiving device 32. According to a signal transmitted by the sensor 312 of the subscriber station 300, the authentication unit 13 senses the subscriber station 300 and acknowledges a location of the subscriber station. In addition, the profile information processor 311 of the subscriber station 300 leads the subscriber information (e.g., the subscriber identification number or the terminal identification number) stored in the storage unit 313, and provides the subscriber information to the authentication unit 13. The authentication unit 13 identifies a subscriber of the sensed subscriber station based on the subscriber information provided by the subscriber station 300. In addition, an access point of the subscriber station is acknowledged based on the information. For example, the access point may be found by the SIP server when a session initiation protocol (SIP) uniform resource identifier (URI) registered on an additional SIP server and the subscriber station having the SIP uniform resource locator (URL) is accessed.

The authentication unit 13 interworks with the profile generator 11 to perform a subscriber registration process in step S200. The authentication unit 13 compares the subscriber information with the information stored in the authentication information module 131, performs the authentication of the subscriber, provides the subscriber identification information used for performing the registration for using the service of the system 100 to the profile generator 11 (the system agent) when the authentication is finished, and registers the subscriber. In addition, the authentication unit 13 provides information on the access point of the subscriber station 300 to the profile generator 11.

When the subscriber authentication and registration is finished, the profile generator 11 (the system agent) negotiates with the profile information processor 311 (the terminal agent) by using the access point of the subscriber station 300, and generates a service profile in step S300.

In further detail, the profile filter 311a of the profile information processor 311 of the subscriber station 300 filters the information provided by the sensor 312 or the user interface device 33, and the information classifying module 311b of the profile information processor 311 classifies the terminal profile information into the static/public profile information and static private profile information. The processing module 311c transmits the filtered and classified terminal profile information to the profile generator 11 of the system 100 through the transmitting and receiving device 32.

The profile generator 11 (the system agent) generates the service profile by combining the subscriber profile information (i.e., the system profile information) selected from the information storage module 111 based on the terminal profile information and the subscriber identification information transmitted from the authentication unit 13. That is, the profile generator 11 combines the previously stored service profile information and the terminal profile information additionally provided from the subscriber station 300, and generates the service profile according to the dynamically varying current subscriber environment. Accordingly, the system profile information may be varied according to the terminal profile information.

Figure 7:
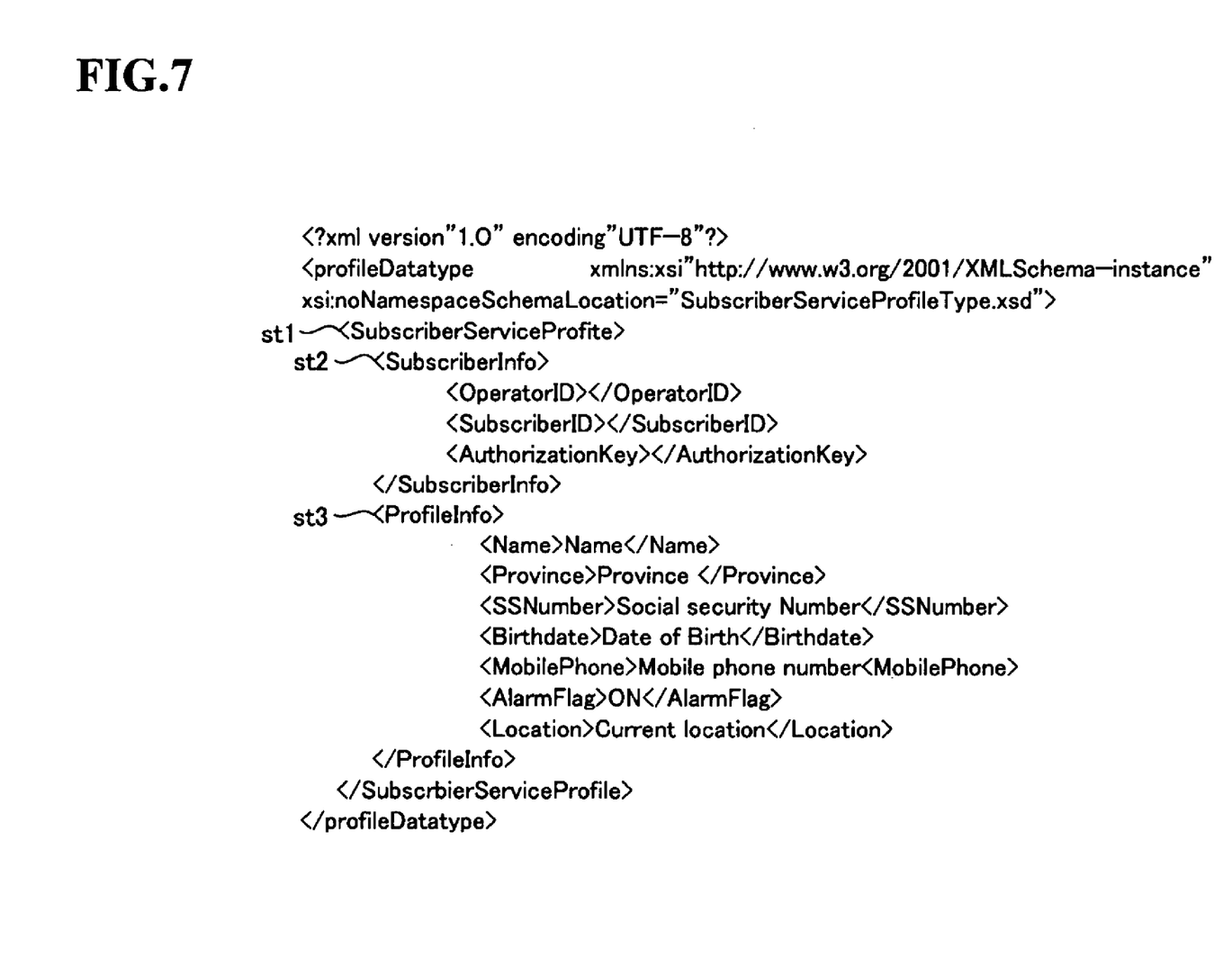
FIG. 7 shows a diagram of a configuration of the generated service profile.

FIG. 7 shows a diagram of a configuration of the generated service profile.

As shown in FIG. 7, the service profile finally generated through the profile negotiation between the terminal agent and the system agent includes a subscriber service profile tag SubscriberServiceProfile st1, a subscriber information tag SubscriberInfo st2, and a profile information tag ProfileInfo st3 that are provided under the subscriber service profile tag SubscriberServiceProfile st1, and the profile information selected by the negotiation is arranged under the profile information tag st3. The information is inputted to the service provider 12 (the service agent) and is used as information for providing the personalized service to the subscriber.

The generated service profile is transmitted to the service provider 12 (the service agent), and at this time, the access point information of a corresponding subscriber station 300 is also transmitted in step S400. While the access point information is not additionally defined in the exemplary embodiment of the present invention, standardized information such as the SIP URI may be used.

To generate the personalized service, the service provider 12 receiving the service profile interworks with the resource manager 14 and receives available information in step S500. A service to be provided to the subscriber is formed by using the transmitted available information in step S600, and the transmitted available information may be formed in the XML format. The formed service may be a web-based service, and may be formed in a list of links of a corresponding service. In addition, the service may be formed in a script for directly controlling the selected available resources by using an additional protocol.

The service information generated by the service provider 12 is provided to the subscriber station 300, and the profile information processor 311 of the subscriber station 300 provides corresponding information to the subscriber through the user interface device 33 in step S700.

In an integrated environment including a wired communication domain, a circuit and packet based wireless communication domain, and a next generation IP-based All IP domain, the exemplary embodiment of the present invention may be applied to an environment including networks performing various communication services in order to provide a ubiquitous service and an environment in which subscribers of corresponding domains are cooperated with each other to support mobility between networks while providing separated services.

According to the exemplary embodiment of the present invention, the subscriber profile information varying depending on the time and location may be efficiently classified and processed.

In addition, the subscriber profile information is separately stored and managed by the subscriber station and the system, and therefore the optimum service profile may be provided by negotiating and combining the separately provided subscriber profile information. The personalized service may be provided by using the agent in a distributed environment, and therefore the optimum personalized service may be provided by using intellectual functions of the subscriber station.

In addition, the subscriber profile information is provided not only to the system but also to the subscriber station to be managed, so that the subscriber may manage the profile information relating to the subscriber. Accordingly, the personalized service may be provided according to more realistic environment of the subscriber.

Therefore, the appropriate service according to the subscriber environment may be provided by using arbitrary resources in a ubiquitous service environment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for classifying and processing profile information for a personalized service in a system providing the service to a plurality of subscriber stations through a network, the subscriber stations being linked to the system, the method comprising:

a) classifying subscriber profile information related to a subscriber into static profile information, which is not varied according to time and context and is managed by the system, and dynamic profile information which is varied according to time and context and is managed by the subscriber station, wherein the static and dynamic profile information is respectively classified into public and private profile information;

b) being provided with terminal profile information which corresponds to the dynamic profile information, from the subscriber station, wherein a profile generator of the system is provided with the terminal profile information comprising at least one piece of dynamic/public profile information and dynamic/private profile information from the subscriber station;

c) generating a service profile based on the terminal profile information and system profile information which corresponds to the static profile information, and the profile generator of the system generates based on the terminal profile information and the system profile information comprising at least one piece of static/public profile information and static/private profile information, the service profile for providing a service to the subscriber station; and d) using an available resource on a network, generating a service to be provided to the subscriber station based on the service profile, and providing the service to the subscriber station.

2. The method of claim 1, further comprising,
filtering the terminal profile information according to a predetermined condition, and transmitting the terminal profile information by the subscriber station to the system.

3. The method of claim 1, wherein the subscriber profile information comprises a subscriber profile tag, the subscriber profile tag comprises a subscriber information tag, a static profile tag, and a dynamic profile tag as a subtag, the static and dynamic profile tags respectively comprise a public tag and a private tag, and the public and private tags comprise various profile information relating to the subscriber.

4. The method of claim 3, wherein the subscriber information tag comprises at least one piece of information among information of an operator for providing the service, information of the subscriber, and information of a key value for authenticating the subscriber.

5. The method of claim 1, wherein the terminal profile information comprises at least one among an alarm flag for providing a corresponding service from the system to the subscriber, a location flag tag comprising a subscriber location, and a feeling tag for representing a subscriber feeling.

6. The method of claim 1, further comprising: authenticating a subscriber station by an authentication unit of the system, the subscriber station accessing the system through a network; and changing the system profile information by the system according to a request of an authenticated subscriber.

7. A system for providing a personalized service to a plurality of subscriber stations, the system linked to the subscriber stations through a network, the system comprising:
   an authentication unit for determining a location of the subscriber accessing the system through the network, and identifying the subscriber;
   a profile generator for receiving terminal profile information according to a subscriber's current situation from the subscriber station, and comprising a storage module storing the system profile information provided for the respective subscribers, wherein the terminal profile information corresponds to dynamic profile information which is varied according to time and context and is managed by the subscriber station, and the system profile information corresponds to static information which is not varied according to time and context and is managed by the system;
   a resource manager for managing and storing information on available resources to be processed on a network; and
   a service provider for selecting the available resource based on the applied service profile, and providing the personalized service to the subscriber station based on the selected available resources,
   wherein the terminal profile information is classified into dynamic/public profile information and dynamic/private information, and the system profile information is static/public profile information and static/private profile information, and
   the profile generator selects the system profile information from the storage module based on the identified subscriber information, combines the terminal profile information provided by the subscriber station and the system profile information, and generates the service profile.

8. The system of claim 7, wherein the subscriber station comprises:
   a sensor unit comprising a plurality of sensors for measuring various information on the subscriber station or various information on the subscriber;
   a storage unit for storing the subscriber or terminal information;
   a user interface device;
   a profile information processor for processing the terminal profile information based on at least one piece of information among predetermined measuring information provided from the sensor according to a selection of the subscriber inputted through the user interface device, information stored in the storage unit, and subscriber input information inputted through the user interface device; and
   a transmitting and receiving device for transmitting first profile information to the system.

9. The system of claim 8, wherein the profile information processor comprises:
   a profile filter for filtering the terminal profile information according to a predetermined condition;
   an information classifying module for classifying the filtered terminal profile information into dynamic/public profile information and dynamic/private profile information; and
   a processing module for negotiating with the profile generator of the system based on the classified terminal profile information, and generating the service profile.

\* \* \* \* \*